UNITED STATES PATENT OFFICE 2,204,167

SOLVENT FOR HIGH MOLECULAR WEIGHT POLYMERS OF ISO-OLEFINS

Peter J. Wiezevich, Elizabeth, N. J., now by judicial change of name Peter J. Gaylor, assignor to Standard Oil Development Company, a corporation of Delaware No Drawing. Application October 17, 1936, Serial No. 106,156

5 Claims. (Cl. 260—32)

This invention relates to high molecular weight polymers of iso-olefins, especially isobutylene, and is more particularly concerned with solvents or plasticizers therefor.

High molecular weight polymers of isobutylene are a series of substantially saturated linear aliphatic hydrocarbons varying in properties from highly viscous liquids to rubber-like elastic solids, having molecular weights ranging from 1000 to 6000, 40,000, 80,000, 150,000, 250,000 or even more, as determined by Staudinger's viscosity method described in his book, "Die Hoch Moleculare Verbindungen." These polymers are used for a variety of purposes. They are commonly used to improve the properties of lubricating oil, gasoline, kerosene, gas oil, greases, heavy oil, and soft or hard paraffin wax; also as ingredients in paints, lacquers, varnishes, enamels, coating compositions generally, and as impregnating materials for textiles, etc.

In many cases hydrogenated rubber, while not as satisfactory as these polymers, may be used for some of the same purposes, and is included in the scope of the present invention. This material is obtained by heating pale crepe, smoke sheet, or other natural rubber with hydrogen and an active hydrogenation catalyst such as nickel at 200–400° C. and 40–200 atm. for 2–6 hrs. in presence of a solvent such as benzene, tetralin, etc. For blending purposes it is desirable to dissolve these polymers first in solvents or plasticizers which will facilitate their incorporation into the materials to which they are added. It will be understood that if small quantities of the solvent are used it will act in the capacity of a plasticizing agent, whereas if large quantities are used it will act more in the capacity of a solvent medium.

The solid polymers are similar to rubber only in some respects and they have entirely different solvent properties. Although they are fairly miscible with or soluble in aliphatic hydrocarbons, and to some extent in aromatic hydrocarbons, they are completely insoluble in most oxygenated hydrocarbons such as acetone, methanol, isopropanol, ethyl acetate, etc.

It is an object of the present invention to provide high boiling oxygenated solvents, preferably boiling above 200° C., in which these polymers will dissolve. The nature of these solvents will be fully disclosed below.

For purposes of description, isobutylene may be taken as a typical iso-olefin. One general method of preparing the high molecular weight polymers of isobutylene is as follows: Isobutylene, preferably purified of sulfur and other olefins, is first dissolved in a suitable solvent. Ethylene and butane are the preferred solvents for this purpose, but pentane or naphtha may also be used. The solution is chilled by any suitable means, conveniently by evaporation of a portion of the light hydrocarbon solvents, to a temperature of —40° to —80° or —100° C. and maintained at this level. A stream of boron fluoride or other suitable catalytic agent is then introduced into the chilled solution. The reaction proceeds vigorously and care must be taken to dissipate the heat generated in order to maintain the temperature below about —40° C. The molecular weight of the polymer produced depends very largely on the purity of the isobutylene and the temperature at which the reaction occurs. In general the highest molecular weight polymers are obtained with isobutylene of high purity and at the lowest reaction temperatures. The reaction occurs almost instantaneously, and in the case of solid polymers the entire mass becomes a semi-solid, rubber-like ball accompanied by evaporation of the light hydrocarbon solvent, which is caused to boil off by the heat generated in the reaction.

Following the polymerization the boron fluoride must be removed from the polymer. This may be done by the addition of water which hydrolyzes the boron fluoride and the water layer may be readily separated from the hydrocarbon layer, which latter contains the polymer, any unpolymerized or only partially polymerized isobutylene and whatever light hydrocarbon solvent remains unevaporated. The volatile constituents not boiled off during polymerization may then be distilled off and the residue is finally distilled under vacuum leaving the desired isobutylene polymer.

According to the present invention the solvent for the polymer is then thoroughly incorporated with the polymerized material. In the case of semi-liquid polymers this is readily accomplished, but in the case of rubber-like solid polymers of extremely high molecular weight, it is preferable to chop up the solid mass into small particles and then to incorporate the solvent by kneading, masticating, or other means. The polymer is preferably heated up to a temperature not over 100° F. to 150° F. to facilitate the incorporation of the solvent. While in most cases it is preferred to incorporate the solvent after the polymerization, it is possible to add the solvent to the solution of isobutylene prior to the initiation of the polymerization reaction.

The quantity of solvent added will naturally depend upon the purposes for which the polymer is to be used. If the polymer is to be blended with oil or other liquid material, it is preferable to use a substantial quantity of the solvent in order to obtain a relatively fluid mass. On the other hand, if the polymer is to be blended with solid materials such as waxes, it is preferable to use relatively small quantities of the solvent, in which case it will act more as a plasticizing agent. Thus the quantity of the solvent used may vary from as little as .1% to as high as 50 or 75% or even more.

The solvents for use according to the present invention are aliphatic esters of fatty saturated or unsaturated acids having more than ten carbon atoms, and aliphatic esters of abietic acid. The preferred solvents are butyl stearate, ethyl oleate, and ethyl abietate, but other materials such as vinyl abietate, hydrogenated products of ethyl abietate and hydrogenated rosin are also quite satisfactory.

In some cases, especially where esters of unsaturated acids such as abietic, linoleic and linolinic are used, it is desirable to add small quantities of metallic driers to the solvent. As suitable examples of these driers may be mentioned cobalt naphthenate, manganese oleate, manganese linoleate, and lead soaps of oxidized wax acids. It will be understood that other agents such as oxidation inhibitors, dyes, resins, cellulose compounds, wax, etc., may also be incorporated with the polymers.

The following examples will illustrate the application of the invention:

Example I

To a sample of ethyl oleate having the following properties

| | | |
|---|---|---|
| Saybolt viscosity @ 100° F | seconds | 46 |
| Saybolt viscosity @ 210° F | do | 32 |
| Flash | ° F | 295 |
| Pour point | ° F | 10 |
| Conradson carbon | | 0.188 | about 5% of polymerized isobutylene of approximately 10,000–20,000 average molecular weight is added. The properties of the blend are as follows:

| | | |
|---|---|---|
| Saybolt viscosity @ 100° F | seconds | 225 |
| Saybolt viscosity @ 210° F | do | 77 |
| V. I | | 166 |
| Flash | ° F | 325 |
| Pour point | ° F | 10 |

Example II

Another sample of ethyl oleate having properties similar to those in Example I is blended with 10% of polyisobutylene of a molecular weight similar to that used in Example I. The blend has the following properties:

| | | |
|---|---|---|
| Saybolt viscosity @ 100° F | seconds | 1035 |
| Saybolt viscosity @ 210° F | do | 340 |
| V. I | | 138 |
| Pour point | ° F | 10 |
| Conradson carbon | per cent | 0.067 |
| Flash point | ° F | 340 |

It can be seen that the polymer improves considerably the flash point and Conradson carbon values of the ester without affecting the pour point. This is of importance particularly if the blend is to be added to lubricating oils.

Example III

A sample of ethyl abietate having the following properties:

| | | |
|---|---|---|
| Saybolt viscosity @ 100° F | seconds | 1011 |
| Saybolt viscosity @ 210° F | do | 60 |
| Flash | ° F | 350 |
| Pour point | ° F | 15 |
| Conradson carbon | per cent | 0.015 | is blended with 4% of polyisobutylene of 8,000–12,000 average molecular weight. The blend has the following properties:

| | | |
|---|---|---|
| Saybolt viscosity @ 100° F | seconds | 5522 |
| Saybolt viscosity @ 210° F | do | 246 |
| V. I | | 96 |
| Pour point | ° F | 15 |

Example IV

A sample of butyl stearate having the following inspection:

| | | |
|---|---|---|
| Saybolt viscosity @ 100° F | seconds | 49 |
| Saybolt viscosity @ 210° F | do | 34 |
| Flash | ° F | 335 |
| Pour point | ° F | 65 |
| Conradson carbon | per cent | 0.007 | is blended with 5% of polyisobutylene of 8,000–10,000 average molecular weight (Staudinger method). The properties of the blend are as follows:

| | | |
|---|---|---|
| Saybolt viscosity @ 100° F | seconds | 298 |
| Saybolt viscosity @ 210° F | do | 95 |
| V. I | | 160 |
| Flash | ° F | 330 |
| Pour point | ° F | 65 |

Example V

A sample of polyisobutylene of 100,000–175,000 average molecular weight is milled, and during the milling operation 3–5% of ethyl abietate is added. A homogeneous plastic product is obtained having a tendency to dry on the surface, leaving a hardened coating.

Example VI

Hydrogenated rubber is cut up into small pieces and placed in a kneading machine and 5% of amyl stearate and 15% of glyceryl montanate are added. A uniform plastic material having a white color is obtained which can be molded readily into different shapes.

This invention is not limited by any details which have been given merely for purposes of illustration, but is limited only in and by the following claims in which it is intended to claim all novelty inherent in the invention.

I claim:

1. A composition of matter comprising a solution of a high molecular weight polymer of isobutylene having a molecular weight lying between 8,000 and 250,000 and an aliphatic ester of an organic fatty acid having more than 10 carbon atoms.

2. A composition of matter comprising a solution of a high molecular weight polymer of isobutylene having a molecular weight lying between 8,000 and 250,000 and an aliphatic ester of an unsaturated fatty organic acid having more than 10 carbon atoms.

3. The composition of matter according to claim 2 in which the ester is ethyl oleate.

4. The composition of matter according to claim 1 in which the ester has a boiling point above 200° C.

5. The composition of matter according to claim 1 in which the ester is present in amounts varying from 0.1% to 50%.

PETER J. WIEZEVICH.